(12) United States Patent
Sugita et al.

(10) Patent No.: US 6,432,578 B1
(45) Date of Patent: Aug. 13, 2002

(54) SEALED CELL

(75) Inventors: Nobuaki Sugita, Sumoto; Eiji Okutani, Hyogo; Kensuke Nakatani; Noriyuki Miyazaki, both of Sumoto, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/428,545

(22) Filed: Oct. 28, 1999

(30) Foreign Application Priority Data

Oct. 30, 1998 (JP) .............................. 10-310234
Oct. 12, 1999 (JP) .............................. 11-289044

(51) Int. Cl.$^7$ .............................. H01M 2/20; H01M 2/26
(52) U.S. Cl. .......................... 429/211; 429/764; 429/94; 429/170
(58) Field of Search ................................ 429/211, 170, 429/171, 164, 94, 169

(56) References Cited

U.S. PATENT DOCUMENTS 5,439,760 A * 8/1995 Howard et al. ............... 429/94
5,663,013 A * 9/1997 Narukawa et al. .......... 429/164
5,834,133 A * 11/1998 Narukawa et al. .......... 429/171

* cited by examiner

*Primary Examiner*—Carol Chaney
*Assistant Examiner*—Tracy Dove
(74) *Attorney, Agent, or Firm*—Armstrong, Westerman & Hattori, LLP

(57) ABSTRACT

A sealed cell has: a cell outer can 60 having a hollow body with a bottom and an opening; a spirally-wound electrode body 40 accommodated in the above-mentioned cell outer can 60, including a positive electrode plate 20 and a negative electrode plate 30 wound with a separator 41; a sealing lid 50 having a sealing plate 51 sealed to the above-mentioned opening of the cell outer can 60 and an insulating member on a bottom of the above-mentioned sealing plate 51; and a positive electrode current collector tab 24 derived from a portion of an exposed core body of the positive electrode plate 20 on an outermost periphery of the above-mentioned spirally-wound electrode body 40; wherein the positive electrode current collector tab 24, the cell outer can 60 and the sealing plate 51 are welded with a tip of the above-mentioned positive electrode current collector tab 24 being held between the above-mentioned sealing plate 51 and an open rim of the above-mentioned cell outer can 60; a spacer 56 composing the above-mentioned insulating member has a concavity 561 in a portion in which the above-mentioned positive electrode current collector tab 24 is led in a direction of the opening of the above-mentioned cell outer can 60; and the above-mentioned positive electrode current collector tab 24 has a bent portion 241 in the above-mentioned concavity 561. According to this construction, it is possible to provide a sealed cell which can prevent disconnection of a current collector tab inside the cell and improve reliability, even when shock such as a drop of the cell is applied to the cell.

11 Claims, 16 Drawing Sheets

CROSS SECTIONAL VIEW
TAKEN ALONG LINE A-A

ENLARGEMENT OF PORTION B

[Fig.2]
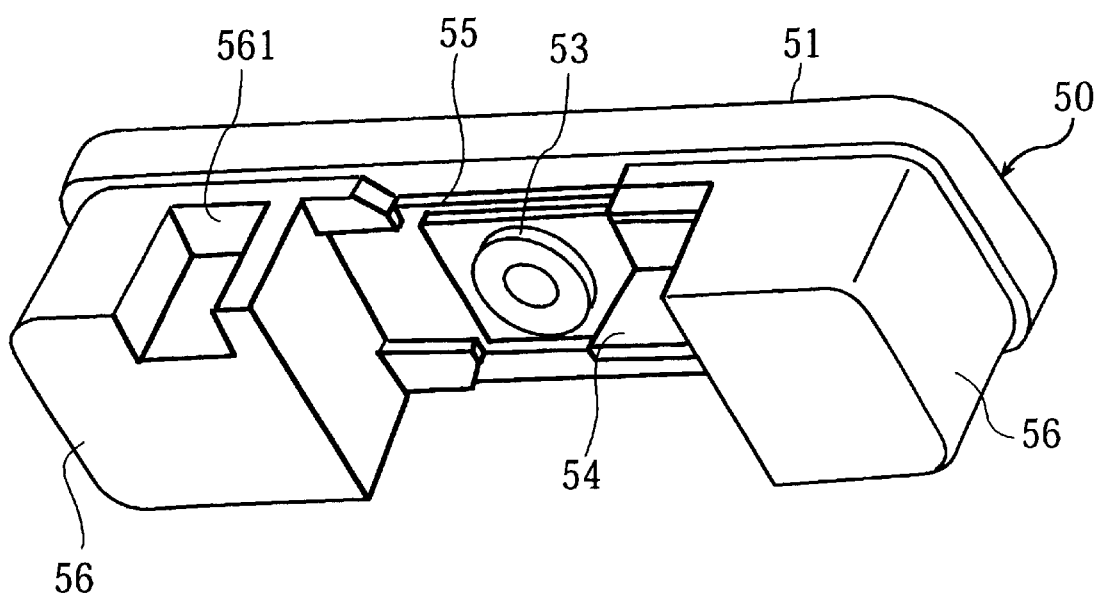

[Fig.4]
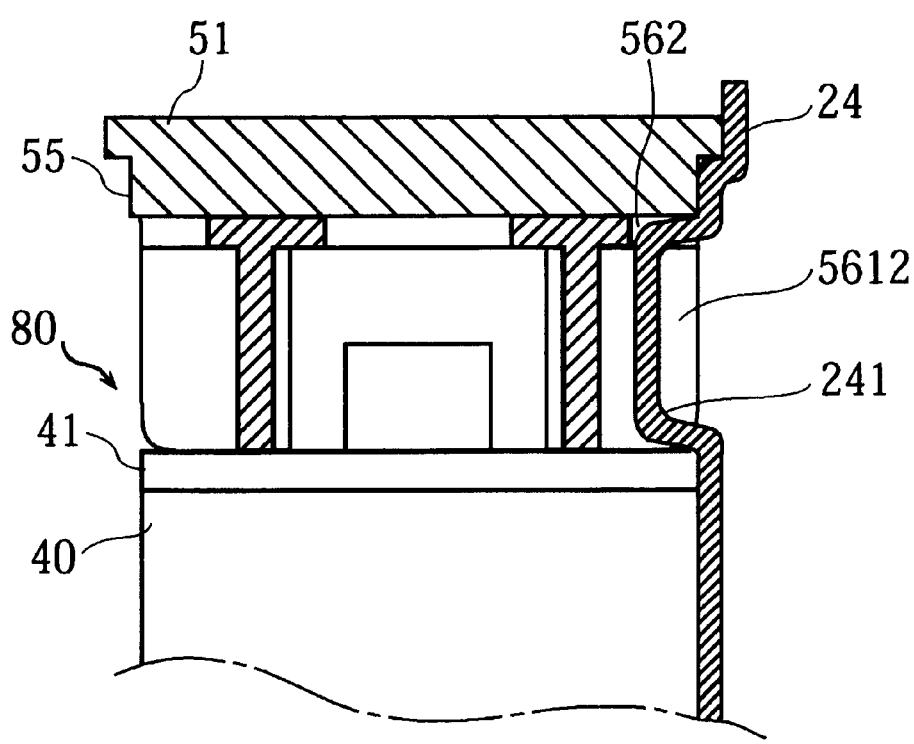

[Fig.5]
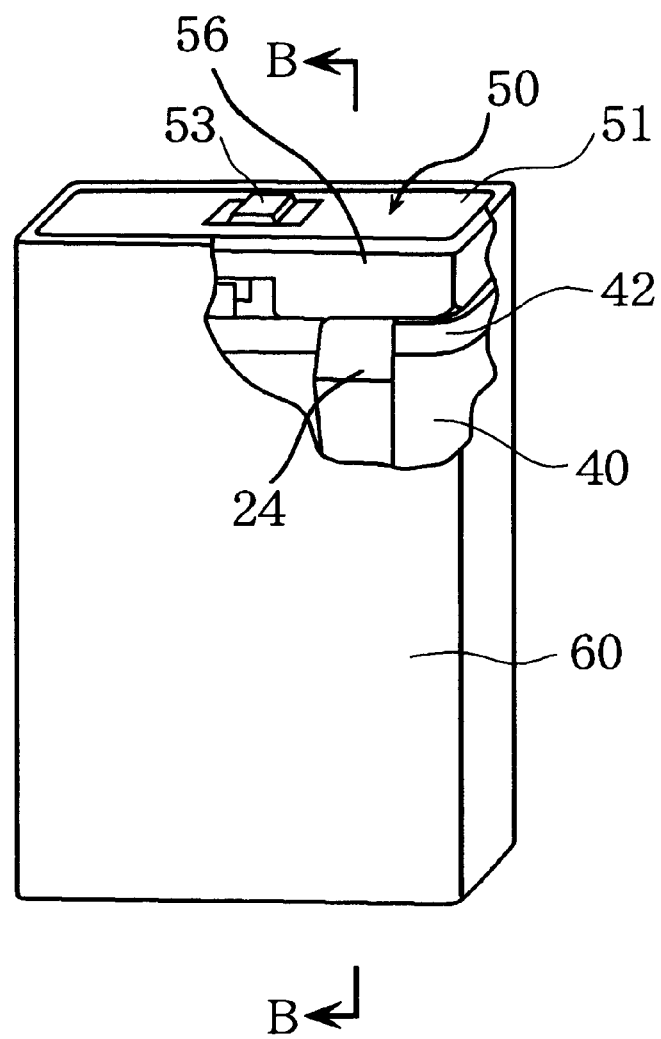

[Fig.6]
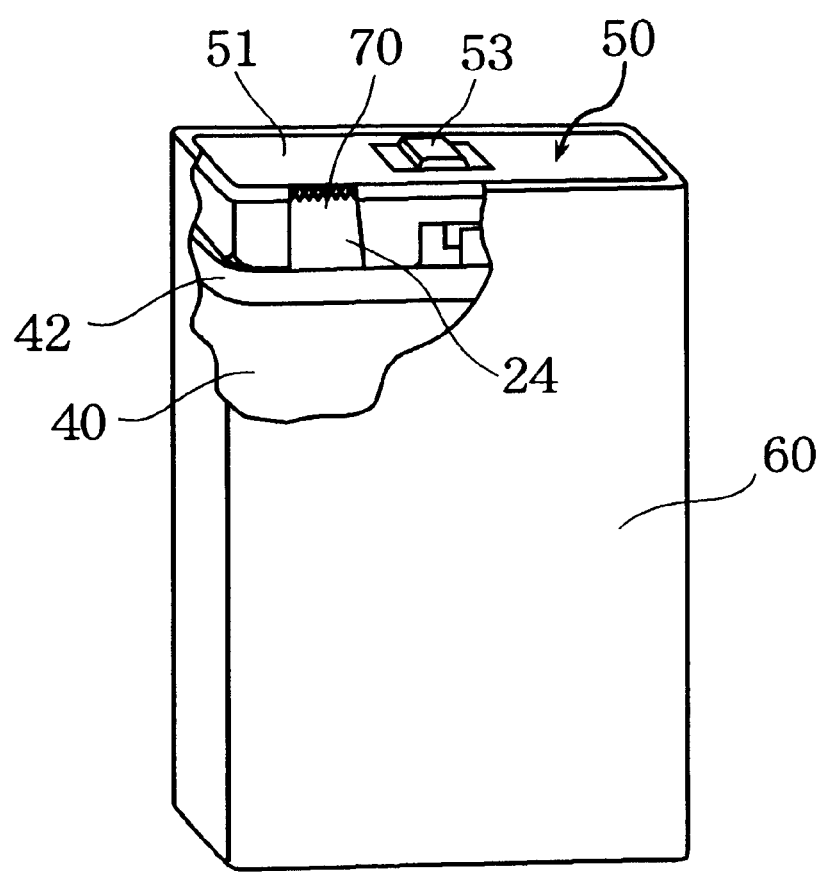

[Fig.7]
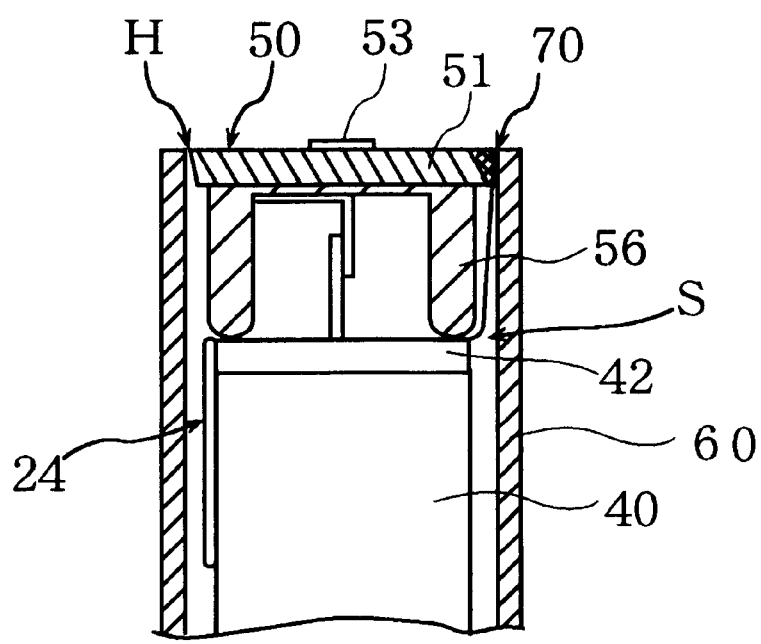

ROLL AXIS

ROLL AXIS

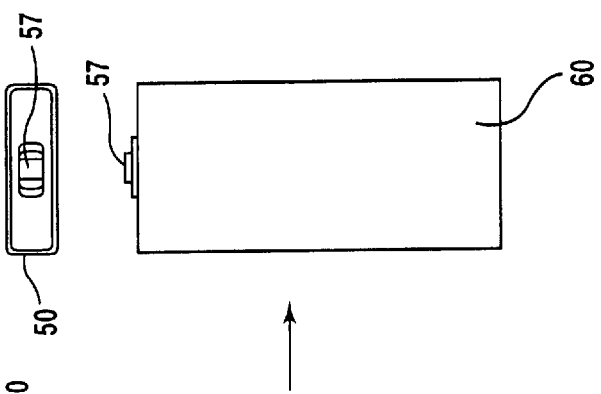
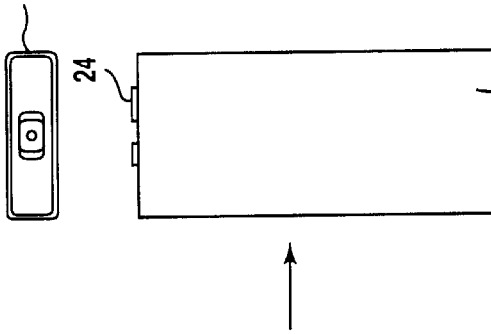
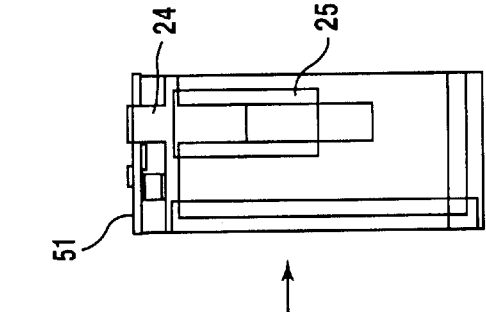
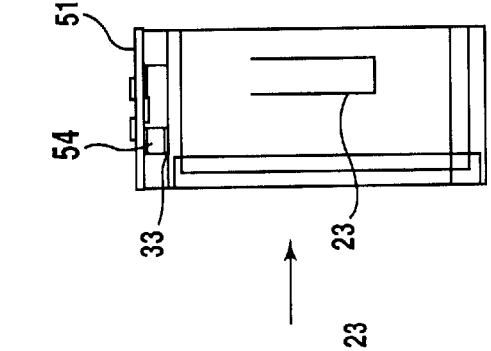
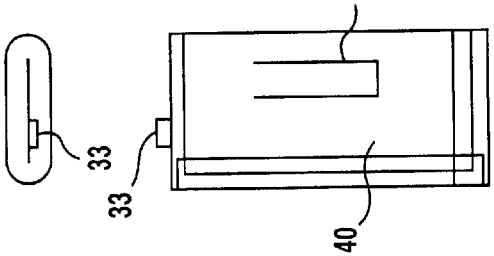

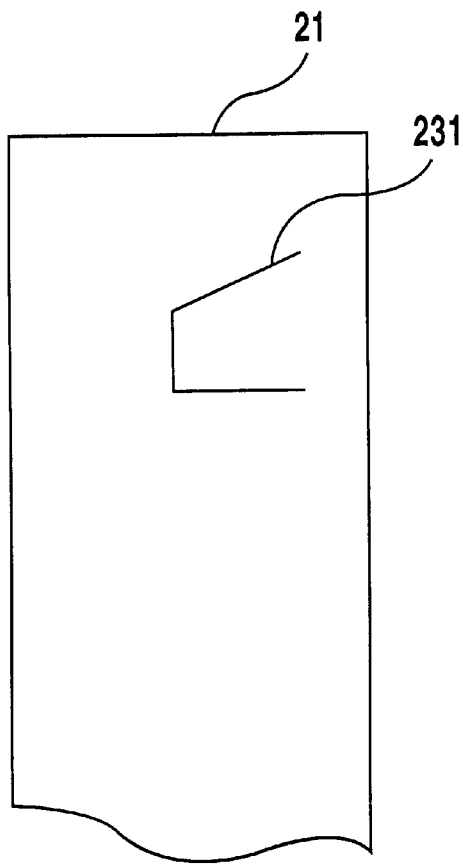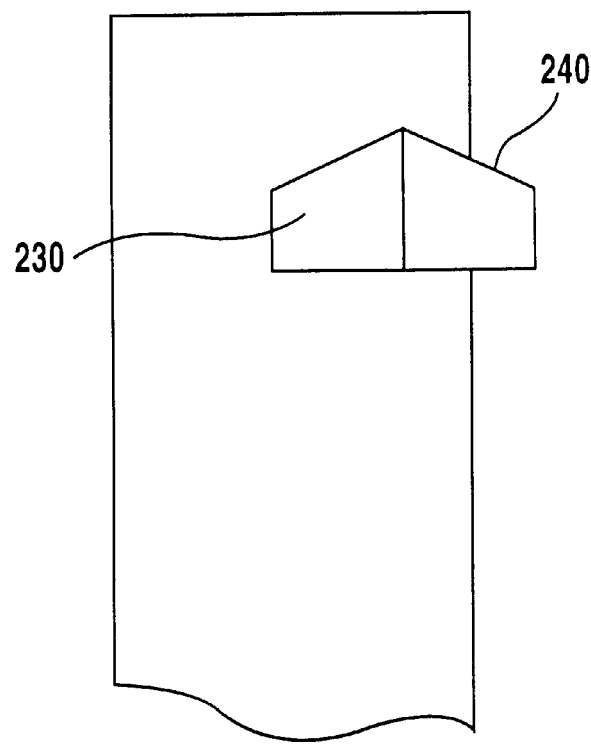
Fig.14(a) PRIOR ART
Fig.14(b) PRIOR ART

SEALED CELL

BACKGROUND OF THE INVENTION (1) Field of the Invention

The present invention relates to a small-sized portable sealed cell, and particularly, to a technique for preventing a disconnection of an electrode current collector tab in a laser-sealed ion cell.

(2) Description of the Prior Art

The Applicants of the present invention disclosed in Japanese Unexamined Patent Publication No. 9-171809, a small-sized portable sealed cell which is sealed by laser-welding a sealing lid to an open rim (end) of a cell outer can accommodating a power-generating component. In this cell, either core body of a positive electrode plate and a negative electrode plate is disposed on the outermost periphery of the power-generating component, an approximately U-shaped slit (a cutting line) is formed in a portion of the exposed core body, and a current collector tab is formed by folding the incised portion formed by the slit in a direction of an opening of the cell outer can. The current collector tab is held between the open rim (end) of the cell outer can and the sealing lid, and the cell is sealed by laser-welding these three members, the current collector tab, the open rim of the cell outer can, and the sealing lid, in this state. Simultaneously, an electric connection of a positive electrode or a negative electrode in the power-generating component to the cell outer can is further improved.

Since this cell is related directly to the point of the present invention, an example of the cell is described below in detail with reference to the drawings.

FIGS. 9(a) and 9(b) show a construction of a positive electrode plate 20.

FIG. 9(a) is a side view of the positive electrode plate and FIG. 9(b) is a front view of it. As shown in the Figures, the positive electrode plate 20 is constructed by applying a positive electrode active material (slurry) 22 consisting of $LiCoO_2$ (the main component), graphite, carbon black, and N-methyl-2-pyrrolidone-containing polyvinylidene fluoride to both sides, in principle, of a slender and thin positive electrode core body 21 made of aluminum foil with a length of 335 mm, a width of 38 mm and a thickness of 20 $\mu$m; by pressing the core body 21 with the positive electrode active material (slurry) 22; and by depositing the slurry by vacuum drying. An approximately U-shaped incised portion 23 is provided on the outermost periphery of the positive electrode core body 21, which is inserted into the cell outer can.

Both sides of a 20 mm-long portion at the end of the roll of the positive electrode core body 21, which is provided with the incised portion 23, do not have the positive electrode active material 22, thereby serving as an exposed core body portion (a two-side exposed portion). In addition, a 50 mm-long portion of the positive electrode core body 21 extending from the end of the two-side exposed portion to the side of a rolling-starting end is formed to have the positive electrode active material 22 only on one side thereof, thereby serving as an exposed core body portion with the other side exposed (a one-side exposed portion). The reason for forming the above-mentioned one-side exposed portion is to electrically connect the cell outer can, also functioning as a positive electrode external terminal, to a positive electrode by contacting the one-side exposed portion to the internal surface of the cell outer can.

FIGS. 10(a) and 10(b) show a construction of a negative electrode plate 30.

FIG. 10(a) is a side view of the negative electrode plate and FIG. 10(b) is a front view of it. As shown in the Figures, the negative electrode plate 30 is constructed by applying a negative electrode active material 32 consisting of powdery natural graphite (the main component) and N-methyl-2-pyrrolidone-containing polyvinylidene fluoride to both sides of a slender and thin negative electrode core body 31 made of copper foil with a length of 315 mm, a width of 39 mm, and a thickness of 18 $\mu$m; and by depositing the negative electrode active material 32 through drying and pressing. Furthermore, a negative electrode lead 33 made of nickel is attached as a negative electrode current collector directly to the negative electrode core body 31 made of copper foil in the portion of a roll axis described later.

FIG. 11 shows a construction of a spirally-wound electrode body 40.

As shown in FIG. 11, the spirally-wound electrode body 40 is formed by rolling the positive electrode plate 20 and the negative electrode plate 30 with a separator 41, which is made of polyethylene and slightly wider than both plates. In this case, because of the above-mentioned reason, the plates are rolled so that the one-side exposed portion, with no positive electrode active material 22 applied, of the positive electrode plate 20 is located on the outermost periphery of the spirally-wound electrode body 40. The rolling-terminal portion of the spirally-wound electrode body 40 is fastened with an adhesive tape (not shown), and the bottom of the spirally-wound electrode body 40 is covered with an insulating tape (not shown) for preventing the contact with the cell can.

A positive electrode current collector tab is formed by folding the incised portion 23 shown in FIG. 9. The above-mentioned incised portion 23 is provided in a position where the electrode plate of the same polarity is located in an internal roll axis of the cell so that the internal short-circuit does not occur even if the burrs in the incised portion 23 damage the separator 41.

FIGS. 12(a) and 12(b) show a construction of a sealing lid 50.

FIG. 12(a) is a partially sectional side view of the sealing lid from which a cell cap is removed. FIG. 12(b) is a perspective view of the sealing lid as viewed from a lower side thereof.

As shown in FIGS. 12(a) and 12(b), the sealing lid 50 includes the sealing plate 51 having a through-hole formed in the central portion thereof a metallic hollow cap 53 fitted in the through-hole with the intervention of an insulating gasket 52, the cell cap (also functioning as a negative electrode external terminal) electrically connected to an upper end of the hollow cap 53, a current collector terminal plate 54 electrically connected to the hollow cap 53, and an insulating plate 55 interposed between the sealing plate 51 and the current collector terminal plate 54 for electrical insulation therebetween.

The insulating gasket 52, the insulating plate 55, and the current collector terminal plate 54 are fixed to the sealing plate 51 by crimping the upper and lower ends of the hollow cap 53. Spacers 56 are provided on both ends of the insulating plate 55 and molded integrally with the insulating plate 55. The spacers 56 are disposed between the sealing plate 51 and the spirally-wound electrode body 40 to support the spirally-wound electrode body 40 for prevention of vertical loose movement. As shown in FIG. 12(b), a part of the current collector terminal plate 54 is folded downward, and the negative electrode lead 33 attached to the negative electrode core body 31 is electrically connected thereto.

FIG. 13 shows the manufacturing process of this cell.

(a) The spirally-wound electrode body 40 is prepared, in which an adhesive tape is stuck at necessary positions for preventing the contact between the spirally-wound electrode body 40 and the bottom of the cell outer can 60, and the disentanglement of the spirally-wound electrode body 40. In FIGS. 13(*a*) to 13(*c*), the reference numeral 33 indicates a negative electrode lead.

(b) The negative electrode lead 33 is electrically connected to the current collector terminal plate 54 fixed to the sealing plate 51 with the sealing plate 51 of the sealing lid 50 being located above the spirally-wound electrode body 40.

(c) The incised portion 23 formed in the portion of the exposed positive electrode core body on the outermost periphery of the spirally-wound electrode body 40 is folded upward to form the positive electrode current collector tab 24.

A protective tape 25 is applied over the positive electrode current collector tab 24, which is thereby fastened to the portion of the exposed positive electrode core body on the outermost periphery of the spirally-wound electrode body 40.

(d) The spirally-wound electrode body 40 electrically connected to the negative electrode lead 33 is inserted into the cell outer can 60 made of aluminum having an approximately rectangular sectional configuration. Then, the positive electrode current collector tab 24 derived from the positive electrode plate 20 is extended along the internal surface of the cell outer can 60 to the open end thereof Next, the sealing lid 50 is fitted to the open end of the cell outer can 60 so that the upper end of the collector tab 24 is held between the circumference of the sealing plate 51 of the sealing lid 50 and the internal surface of the cell outer can 60.

(e) Subsequently, a laser beam is applied to the portion where the sealing plate 51 is fitted in the cell outer can 60 to weld the sealing plate 51 to the cell outer can 60. Consequently, the cell is sealed and at the same time, electrical connection between the positive electrode current collector tab 24 and the cell outer can 60 is firmly established.

Thereafter, a nonaqueous electrolyte is injected into the cell outer can 60 from the through-hole of the sealing plate 51, and the through-hole is capped with the cell cap 57.

Thus, the manufacturing of the cell is completed.

Furthermore, various improvements have been made besides the above.

For instance, as shown in FIG. 14(*b*), the shape of the incised portion of the positive electrode plate is a trapezoid such that one of its sides is at right angles to the upper base and the lower base when the positive electrode plate is inserted into the cell outer can, to improve the mechanical strength.

FIG. 14(*a*) shows a portion of the positive electrode core body 21 in which a slit 231 is provided. FIG. 14(*b*) shows a positive electrode current collector tab 240 which is formed by folding an incised portion made by the slit 231. The reference numeral 230 indicates a hole in the positive electrode core body 21, which has been produced by folding the incised portion.

In another example, as shown in FIG. 15, the sealing lid 50 comprises the spacers 56 which are molded integrally with the insulating plate 55 and have a wall 58.

The wall 58 is drawn by dotted lines in FIG. 15 so that the difference between FIGS. 12(*b*) and 15 is easily understood.

The wall 58 is provided to prevent the positive electrode current collector tab 24 (formed by folding the incised portion 23) derived from the portion of the exposed positive electrode core body on the outermost periphery of the spirally-wound electrode body 40 from contacting the current collector terminal plate 54 having a reverse polarity. The wall 58 is formed on the side where the positive electrode current collector tab 24 is located. The positive electrode current collector tab 24 is extended between the outer surface of the wall 58 and the internal surface of the cell outer can 60 to the circumference of the sealing plate 51 (to the open end of the cell outer can 60), and held by the welded portion between the sealing plate 51 and the cell outer can 60. In addition, it goes without saying that this current collector tab may be provided not on the positive electrode side but on the negative electrode side, depending on the manner of the rolling of the spirally-wound electrode body 40.

Furthermore, the insulating plate, the spacer, and the negative electrode current collector terminal plate have various constructions.

Besides the above, laser-welding is generally used in the sealing of the cell at the current state of the art. However, there is a possibility that other welding techniques will substitute for the laser-welding because of the progress of technology in the future.

A problem arises, however, when a user drops the above-mentioned cell or the apparatus equipped with the cell by mistake.

That is, as shown in FIG. 16, when shock such as a drop is given to the cell, the positive electrode current collector tab 24 in the above-mentioned conventional sealed cell is pulled downward since the spirally-wound electrode body 40 tends to move downward (C direction in FIG. 16). Consequently, as shown in FIG. 17, there is a possibility of a disconnection of the positive electrode current collector tab 24 near a welded part 70.

The reason is that the above-mentioned spirally-wound electrode body 40 and the nonaqueous electrolyte can move or shake since a slight gap exists or can be formed between the spirally-wound electrode body 40 and the cell outer can 60, and a gas besides the nonaqueous electrolyte exists inside the cell outer can 60. As described above, the current collector tab formed by folding the positive or negative electrode core body made of aluminum or copper foil is inherently susceptible to disconnection because of a low mechanical strength thereof.

Needless to say, the current collector tab should have a shape and construction to ensure sufficient safety and strength even in the case of accidents and mishandling. It is preferable that consideration and measures for such accidents be taken in consideration of the recent expansion of uses for the cell and the recent increase in importance of the cell in daily life.

It is not preferable to use aluminum, copper and alloys thereof, having a high strength, or other metals, because they cause an increase in internal resistance as well as in manufacturing costs.

It is inconvenient when inserting the spirally-wound electrode body into the cell outer can if there is no gap between the spirally-wound electrode body and the cell outer can, into which the spirally-wound electrode body is inserted.

It is not preferable to fasten the spirally-wound electrode body inside the cell outer can by using a double-sided tape for the insulating tape on the bottom of the spirally-wound electrode body or for the adhesive tape in the rolling-terminal portion of the spirally-wound electrode body because this may cause a decrease in working efficiency and unexpected chemical reaction between the tape and the nonaqueous electrolyte.

It is not preferable to provide excessively complex structures, for example, an expansion portion such as an expander for the current collector tab, which may cause an increase in the size of the cell, a decrease in the capacity, and extra costs for rare accidents.

SUMMARY OF THE INVENTION

The present invention is accomplished in consideration of the above-mentioned problems. The object of the invention is to provide a sealed cell which can prevent a disconnection of a current collector tab and thereby improve reliability, even in the case where shock, such as a drop of the cell, is applied to the cell.

In order to achieve the above-mentioned objects, the invention provides, in accordance with a first aspect of the invention, a sealed cell comprising: a cell outer can having a hollow body with a bottom and an opening; a spirally-wound electrode body accommodated in the above-mentioned cell outer can, including a first electrode plate and a second electrode plate wound with a separator; a sealing lid having a sealing plate sealed to the above-mentioned opening of the cell outer can; and a first current collector tab derived from a portion of an exposed core body of the first electrode plate on an outermost periphery of the above-mentioned spirally-wound electrode body; wherein the first current collector tab, the cell outer can and the sealing plate are welded with a tip of the above-mentioned first current collector tab being held between the above-mentioned sealing plate and an open rim of the above-mentioned cell outer can; and the tip of the first current collector tab is welded at a position in the open rim, the position being other than a shortest distance position which is at the shortest distance from a position in the first current collector tab at which the tab is connected with the first electrode plate, whereby a disconnection of the first current collector tab caused by a movement of the spirally-wound electrode body is prevented.

The above-mentioned sealed cell is characterized in that the tip of the first current collector tab is welded at a position in the open rim, the position being other than a shortest distance position which is at the shortest distance from a position in the first current collector tab at which the tab is connected with the first electrode plate, whereby a disconnection of the first current collector tab caused by a movement of the spirally-wound electrode body is prevented. (The above-mentioned shortest distance position indicates a welded portion in the conventional method.)

In the conventional case of welding the first current collector tab at the above-mentioned shortest distance position, there is a possibility of a disconnection of the current collector tab near the welded portion of the current collector tab since the current collector tab has little play when tension is applied to the current collector tab due to the movement of the spirally-wound electrode body by a dropping of the cell. However, since the first current collector tab in the present invention is longer than a current collector tab in a conventional art and has some play, the first current collector tab can decrease the force applied to the above-mentioned welded portion by the movement of the spirally-wound electrode body in the direction of the bottom of the cell outer can at a drop of the cell. Therefore, the first current collector tab can prevent a disconnection of the current collector tab.

In accordance with a second aspect of the invention, there is provided a sealed cell as in the first aspect, wherein the shape of the open rim of the cell outer can is substantially rectangular; and the tip of the first current collector tab is located on a side of the rectangular shape opposing the side where the shortest distance position is located.

The above-mentioned construction is characterized in that the shape of the open rim of the above-mentioned cell outer can is rectangular, and the tip of the first current collector tab is located on a side of the rectangular shape opposing the side where the shortest distance position is located. As described above, when the tip of the first current collector tab is located on a side of the rectangular shape opposing the side where the shortest distance position is located, it is possible to increase the length from the position in the first current collector tab at which the tab is connected with the first electrode plate to the tip of the first current collector tab, namely the length of the first current collector tab, and to prevent a disconnection of the current collector tab by decreasing the force applied to the welded portion. In addition, it is possible to prevent the above-mentioned current collector tab from being twisted.

In accordance with a third aspect of the invention, there is provided a sealed cell as in the second aspect of the invention, wherein in the open rim of the cell outer can, the tip of the first current collector tab is located at such a position that the shortest distance position and the tip of the first current collector tab are at the shortest possible distance from each other.

According to the above-mentioned construction, when in the open rim of the cell outer can, the tip of the first current collector tab is located at such a position that the shortest distance position and the tip of the first current collector tab are at the shortest possible distance from each other, the above-mentioned first current collector tab is never twisted and is accommodated most stably in the cell outer can. Since the above-mentioned first current collector tab occupies the least space, the construction is particularly effective in a small-sized portable cell with little extra space.

In accordance with a fourth aspect of the invention, there is provided a sealed cell as in the first aspect, wherein the shape of the open rim of the cell outer can is a circle oran ellipse; and the tip of the first current collector tab is located in such a position that, in the circle or the ellipse, the distance between the tip of the first current collector tab and the shortest distance position is longer than a quarter of the circumference of the circle or ellipse.

The above-mentioned construction is described referring to FIGS. 8(*a*) and 8(*b*). FIG. 8 is a conceptional plan view showing the location of the shortest distance position and the tip of the first current collector tab in a sealed cell. As shown in FIGS. 8(*a*) and 8(*b*), when the shape of the open rim of the cell outer can is a circle (FIG. 8(*a*)) or an ellipse (FIG. 8(*b*)), the tip of the first current collector tab D is located at a point (in the range indicated by the arrows in FIGS. 8(*a*) and 8(*b*)) away from the above-mentioned shortest distance position E by a quarter or longer than the circumference of the above-mentioned circle or ellipse. Consequently, it is possible to increase the length from the position in the first current collector tab at which the tab is connected with the first electrode plate to the tip of the first current collector tab D, namely, the length of the first current collector tab, and to prevent a disconnection of the current collector tab by decreasing the force applied to the welded portion. In addition, it is possible to prevent the above-mentioned current collector tab from being twisted.

In accordance with a fifth aspect of the invention, there is provided a sealed cell as in the second aspect, wherein the first current collector tab is led between an insulating member and the spirally-wound electrode body, the insulating member disposed on a bottom of the sealing plate; and the sealed cell further comprises means for preventing a short-circuit of the first current collector tab and the second electrode plate, the means disposed between the first current collector tab and the spirally-wound electrode body.

In a conventional construction, the first current collector tab derived from the first electrode is extended linearly in the direction of the opening of the cell outer can, while the cell as in the fifth aspect has a construction in which the above-mentioned first current collector tab is led between the above-mentioned insulating member and the above-mentioned spirally-wound electrode body, and the tip of the first current collector tab is welded between the circumference of the above-mentioned sealing plate and the internal surface of the above-mentioned cell outer can. According to the above-mentioned construction, when shock is given to the cell such as a drop of the cell and the spirally-wound electrode body moves relatively (the direction of the bottom of the cell outer can) to the cell outer can, the above-mentioned first current collector tab rotates in the direction of the bottom of the cell outer can on an axis of a bent point S (in FIG. 7) of the first current collector tab, and thereby it is possible to decrease the shock (the force to the direction of the bottom of the cell outer can) near the above-mentioned welded portion of the first current collector tab. Consequently, even if shock such as a drop is given to the cell and the above-mentioned spirally-wound electrode body moves relatively to the cell outer can, it is possible to prevent a disconnection of the above-mentioned first current collector tab.

The first current collector tab is longer than a conventional current collector tab and is led between the above-mentioned insulating member and the above-mentioned spirally-wound electrode body. As a result, space inside the cell outer can is utilized effectively. This construction is particularly effective in a small-sized portable cell with little extra space.

Since the means for preventing a short-circuit between the above-mentioned first current collector tab and the second electrode plate in the spirally-wound electrode body is provided between the above-mentioned first current collector tab and the spirally-wound electrode body, the above-mentioned first current collector tab never contacts with the above-mentioned second electrode plate, and thereby a short-circuit can be prevented inside the cell.

In accordance with a sixth aspect of the invention, there is provided a sealed cell as in the fifth aspect, wherein the means for preventing a short-circuit is an insulating body disposed on the spirally-wound electrode body.

According to the above-mentioned construction, the first current collector tab derived from the above-mentioned first electrode plate is led between the above-mentioned insulating body and the above-mentioned insulating member. Therefore, the above-mentioned first current collector tab never contacts with the top of the above-mentioned spirally-wound electrode body (specifically, with the second electrode plate in the spirally-wound electrode body), and thereby a short-circuit can be prevented inside the cell.

In accordance with a seventh aspect of the invention, there is provided a sealed cell comprising: a cell outer can having a hollow body with a bottom and an opening; a spirally-wound electrode body accommodated in the above-mentioned cell outer can, including a first electrode plate and a second electrode plate wound with a separator; a sealing lid having a sealing plate sealed to the above-mentioned opening of the cell outer can and an insulating member on a bottom of the above-mentioned sealing plate; and a first current collector tab derived from a portion of an exposed core body of the first electrode plate on an outermost periphery of the above-mentioned spirally-wound electrode body; wherein the first current collector tab, the cell outer can and the sealing plate are welded with a tip of the above-mentioned first current collector tab being held between the above-mentioned sealing plate and an open rim of the above-mentioned cell outer can; the above-mentioned insulating member has a concavity in a portion in which the above-mentioned first current collector tab is led in a direction of the opening of the above-mentioned cell outer can; and the above-mentioned first current collector tab has a bent portion in the concavity of the above-mentioned insulating member.

The above-mentioned construction is characterized in that the insulating member (including a spacer integrally with or separately from the sealing lid) on the bottom of the sealing lid has a concavity in a portion in which the above-mentioned first current collector tab is led between the open rim of the cell outer can and the sealing lid, and the first current collector tab has a bent portion (play against extension) along the concavity.

Consequently, when shock is given to the cell by wrong operations or mistakes by users and the spirally-wound electrode body moves relatively to the cell outer can and the sealing lid, the bent portion of the first current collector tab in the concavity extends in the direction of the bottom of the cell outer can, and thereby the movement of the above-mentioned spirally-wound electrode body is decreased. Therefore, even if shock such as a drop is given to the cell and the above-mentioned spirally-wound electrode body moves, it is possible to decrease the force on the welded portion of the above-mentioned first current collector tab and to prevent a disconnection of the first current collector tab.

In accordance with an eighth aspect of the invention, there is provided a sealed cell as in the seventh aspect, wherein the concavity is opened in a direction of the bottom of the cell outer can.

The above-mentioned concavity is formed on the insulating member (including a spacer) on a bottom of the above-mentioned sealing lid and is opened in a direction of a bottom of the cell outer can. Therefore, if shock is applied to the cell such as a drop of the cell, the first current collector tab extends smoothly in the direction of the bottom of the above-mentioned cell outer can, and furthermore, it is possible to prevent a disconnection of the first current collector tab and to improve the reliability of the cell.

In accordance with a ninth aspect of the invention, there is provided a sealed cell as in the seventh aspect, wherein the above-mentioned first current collector tab is formed by giving a slit to a portion of an exposed core body of the first electrode plate on an outermost periphery of the above-mentioned spirally-wound electrode body, and folding the incised portion in a direction of an opening of the above-mentioned cell outer can.

The first current collector tab is formed by folding the above-mentioned incised portion (the incised portion refers to a folded portion which is connected to the core body and to the sealing lid, and may have various shapes such as a U-shape, a V-shape, a trapezoidal shape wherein one of its sides is at right angles to the upper side and the lower side, or a shape with round corners) in a direction of an opening of the above-mentioned cell outer can, and the first current collector tab thus formed does not have a high strength inherently. When the above-mentioned spirally-wound electrode body moves relatively to the cell outer can at a drop of the cell, tension is applied to the above-mentioned current collector tab, and thereby a disconnection of the current collector tab occurs in the welded portion of the current collector tab. However, according to the above-mentioned construction, since it is possible to decrease the force on the current collector tab, a disconnection of the current collector tab never occurs even if the current collector tab is formed by folding the core body of the electrode body.

The step of spot-welding the current collector tab is not required in the case of forming the current collector tab by folding, and thereby the manufacturing process can be simplified.

As described above, according to the present invention, it is possible to prevent a disconnection of the current collector tab even in the case of giving shock to the cell such as a drop of the cell and thereby to improve the reliability of a sealed cell greatly.

BRIEF DESCRIPTION OF THE DRAWINGS

FIG. 2 is a perspective view of a sealing lid used for a sealed cell of Embodiment 1 according to the present invention.

FIG. 4 is a view showing the play against bend and extension in a concavity of a spacer of a positive electrode current collector tab in the above-mentioned Example 1–2.

FIG. 5 is a partially cross sectional view showing a folded portion of a positive electrode current collector tab of a sealed cell of Embodiment 2 according to the present invention.

FIG. 6 is a partially cross sectional view of a laser-welded portion (the opposite side of FIG. 5).

FIG. 7 is a cross sectional view taken along the line B—B in FIG. 5.

FIGS. 13(a) to 13(e) are descriptive views showing a method of constructing a positive electrode current collector tab formed by folding the core body, a sealing lid and a cell outer can of a prior-art sealed cell mainly by welding.

FIGS. 14(a) and (b) are views showing another example of a current collector tab, formed by using a positive electrode core body, of a prior-art sealed cell.

DESCRIPTION OF THE PREFERRED EMBODIMENTS

Embodiments (or Examples) of the present invention are described below based on FIGS. 1 to 7.

Embodiment 1

Figure 1A:
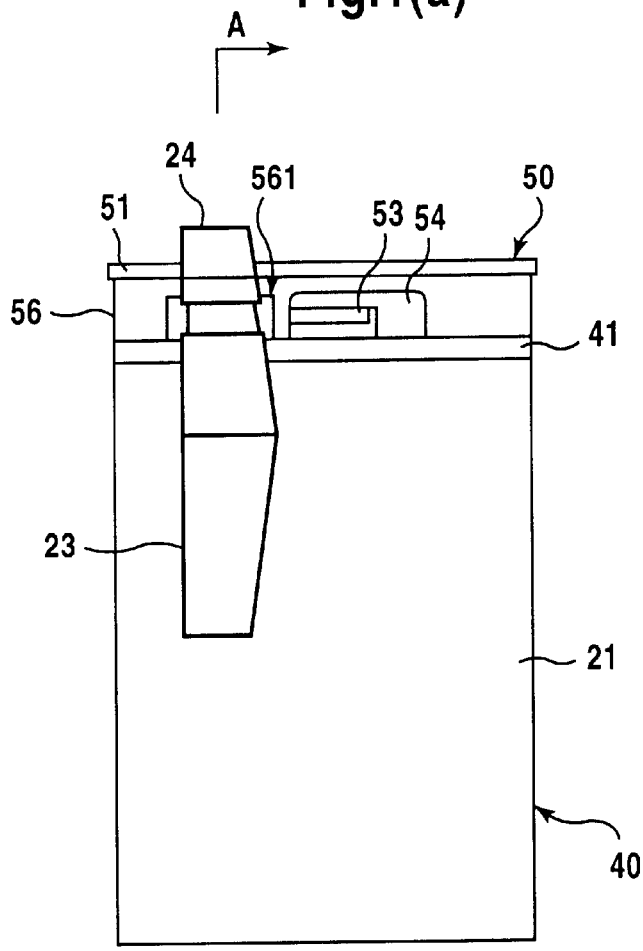
FIG. 1(a) is a front view.
Figure 1B:
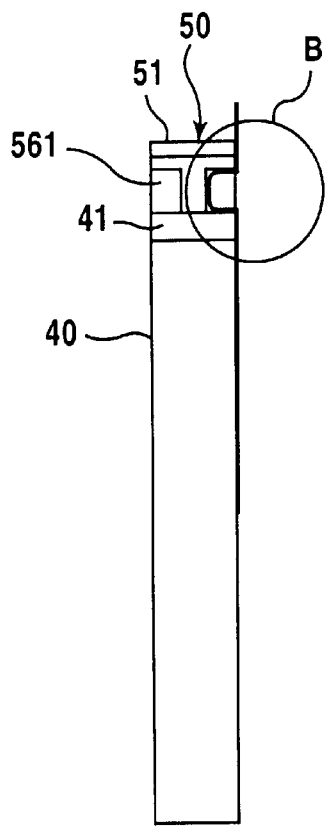
FIG. 1(b) is a cross sectional view and FIG. 1(c) is an enlargement view showing a spirally-wound electrode body and a sealing lid, immediately before being inserted into a cell outer can, of a sealed cell of Embodiment 1 according to the present invention.
Figure 1C:
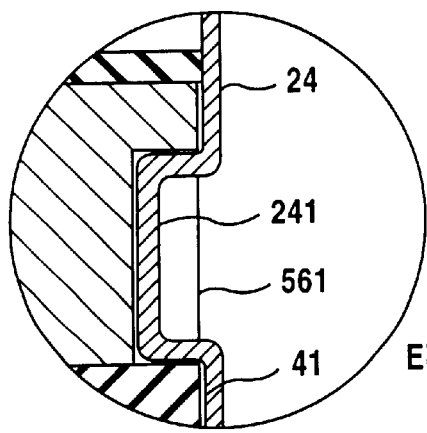

FIG. 1 is a view showing a spirally-wound electrode body 40 connected to a sealing lid 50 of a sealed cell according to Embodiment 1 of the present invention, in which a positive electrode current collector tab 24 (a first current collector tab) is folded to the side of the sealing lid 50, namely, a state immediately before the spirally-wound electrode body 40 is inserted into a cell outer can. FIG. 2 is a perspective view of a sealing lid used for a sealed cell according to Embodiment 1.

As shown in FIG. 1, the positive electrode current collector tab 24 having a trapezoid shape such that one of its sides is at right angles to the shorter upper base (the side of the sealing lid 50) and the longer lower base, is formed by folding upward an incised portion 23 (which width becomes narrower in the direction of a welded portion) formed in a portion of an exposed positive electrode core body 21 on the outermost periphery of the spirally-wound electrode body 40.

A concavity 561, which is opened on the side of a separator 41 (the bottom side) and guides the positive electrode current collector tab 24 to the side of the sealing lid 50, is formed in a spacer 56 composing an insulating member disposed on the bottom of the sealing lid 50. The above-mentioned positive electrode current collector tab 24 is led along the surface of the concavity 561 so as to have a bent portion (play) 241 in the above-mentioned concavity 561. (Although the thicknesses of the positive electrode current collector tab 24 and the above-mentioned bent portion 241 are exaggerated for clarity in FIG. 1, the tab is actually of a foil with a thickness of 20 $\mu$m.)

Figure 12A:
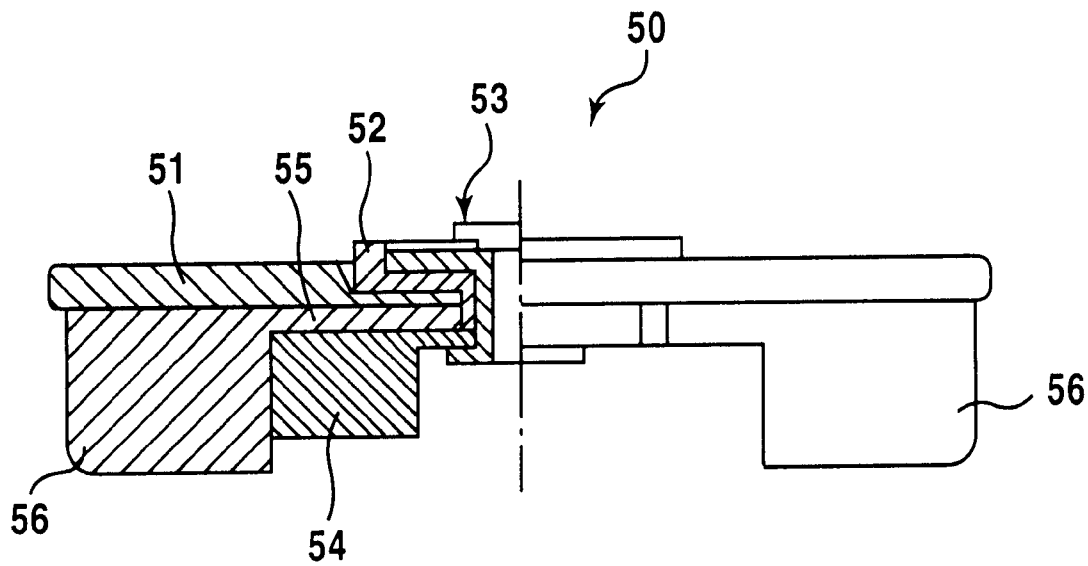
FIGS. 12(a) and 12(b) are constructional views showing an example of a sealing lid of a prior-art sealed cell.
Figure 12B:
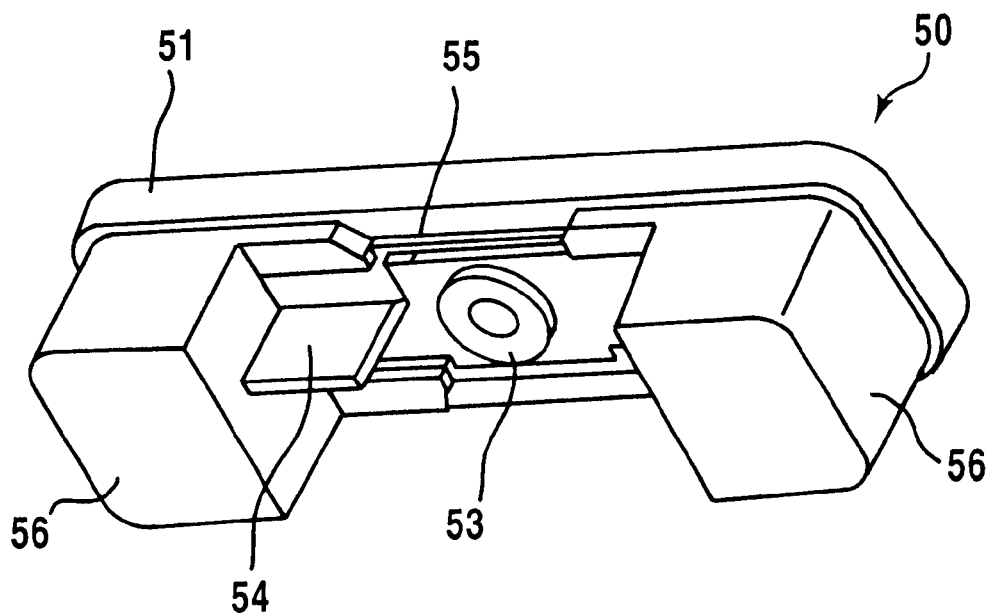
Figure 15:
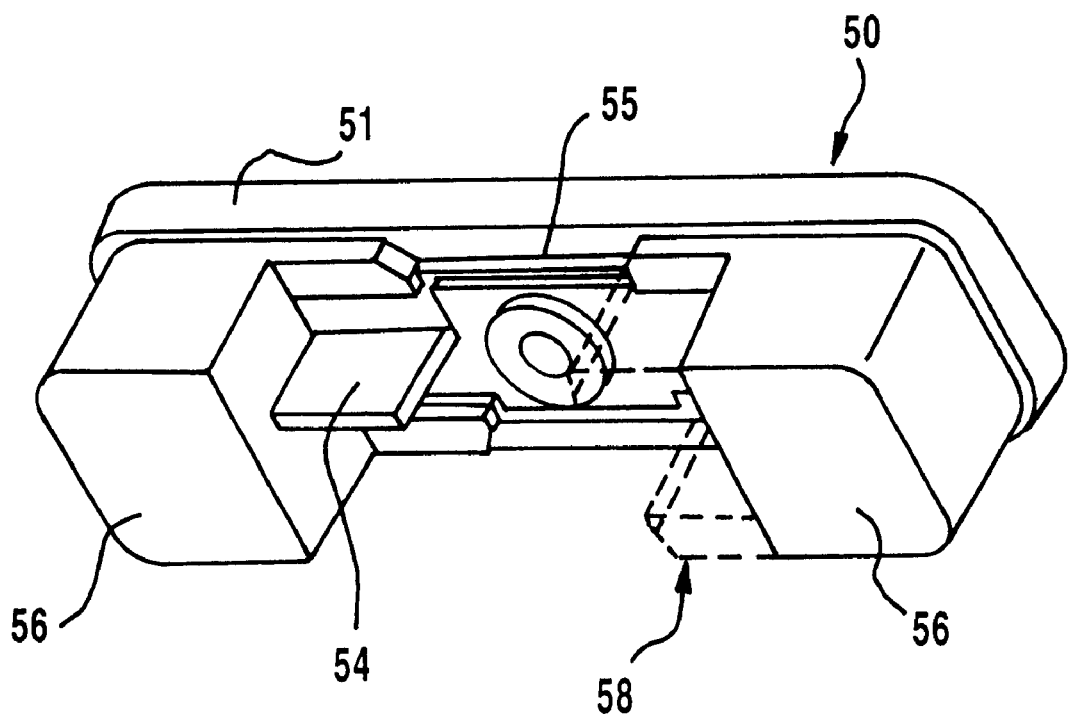
FIG. 15 is a view showing another example of a sealing lid of a prior-art sealed cell.
Figure 16:
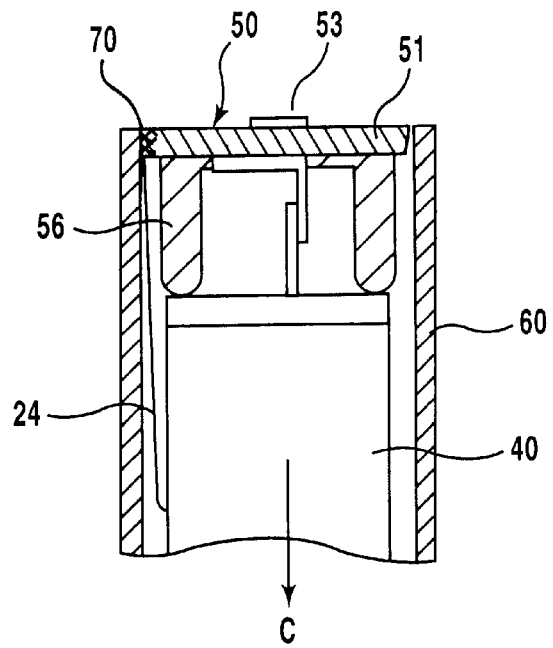
FIG. 16 is a cross sectional view showing a conventional sealed cell to which shock is applied.
Figure 17:
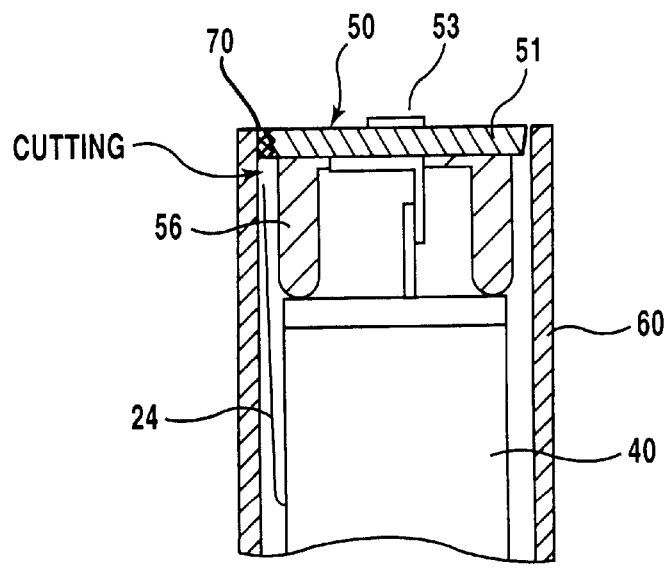
FIG. 17 is a cross sectional view showing a disconnection of tab caused by giving shock to a conventional sealed cell.

FIG. 2 shows the main portion of the above-mentioned sealing lid 50. FIG. 2 is a counterpart of FIG. 12(b) showing a sealing lid in a conventional cell. The front and back (or right and left) are drawn in reverse in order to clearly show the concavity 561, and consequently the current collector terminal plate 54 shown in FIG. 2 is located on the right in the figure, opposite to FIG. 12. The concavity 561 and the current collector terminal plate 54 are located to be symmetrical with respect to the center of the sealing lid 50 so as to minimize defects such as contacts between the positive and negative electrode current collector terminals and between the tabs.

The spirally-wound electrode body 40 and the sealing lid 50 shown in FIG. 1 are inserted into the cell outer can (not shown in FIG. 1), and as described above, the circumference of the top of the sealing lid 50, the positive electrode current collector tab 24 formed by folding a core body, and the open rim of the top of the cell outer can are laser-welded together. In addition, on the upper side of the spacer 56 directly above the concavity 561, the positive electrode current collector tab 24 formed by folding the core body is held between the internal surface of the cell outer can and the spacer 56, and thereby it is possible to ensure electric connection between the tab 24 and the cell outer can.

An actual cell has such components as an insulating tape on the bottom of the spirally-wound electrode body, an adhesive tape for fixing the positive electrode current collector tab (formed by folding) on the external surface of the spirally-wound electrode body and protecting the tab, a negative electrode core body, and a safety valve. Since these components are not directly related to the point of the present invention and the illustrations are complicated, they are not shown in FIGS. 1 and 2; however, a sealed cell of Embodiment 1 is equipped with them according to necessity.

EXAMPLE 1-1

The above-mentioned sealed cell of Embodiment 1 was used in Example 1-1. The cell thus manufactured is hereinafter referred to as a cell A1 of the present invention.

COMPARATIVE EXAMPLE 1-1

A prior-art sealed cell was manufactured as described in the Description of the Prior Art. The cell thus manufactured is hereinafter referred to as a comparative cell X1.

Experiment 1

The shock-resistance of the cell A1 of the present invention and the comparative cell X1 was examined by conducting an experiment. In the experiment, 100 samples of the cell A1 of the present invention and 100 samples of the comparative cell X1 were prepared and the samples were dropped 100 times onto a concrete floor from a height of 1.5 m with the bottom of the cell outer cans downward. The result is shown in Table 1.

TABLE 1

| cell | Number of cell showing increase in internal resistance |
| --- | --- |
| cell A1 of the present invention | 0/100 |
| comparative cell X1 | 36/100 |

As clearly shown in Table 1, the disconnection of the positive electrode current collector tab was caused in 36 out of 100 samples of the comparative cell X1, and thereby an increase in internal resistance was brought about. (Since the portion of an exposed positive electrode core body and the internal surface of the cell outer can are contacted, internal resistance never becomes infinitely large even if the positive electrode current collector tab is completely disconnected.)

However, all of the 100 samples of the cell A1 of the present invention were in working order.

It is understood through the above that the cell A1 of the present invention, wherein the concavity 561 is formed in the spacer 56 and the positive electrode current collector tab 24 has the bent portion 241 in the above-mentioned concavity 561, has a higher reliability in terms of current collection than the comparative cell X1.

EXAMPLE 1-2

In Example 1-2, a spacer 80, in addition to the sealing plate 51 and the insulating plate 55, is provided between the spirally-wound electrode body 40 and the sealing lid 50, more precisely, between the spirally-wound electrode body 40 and the sealing plate 51 or the insulating plate 55 at the top of the sealing lid 50. A concavity 562 is formed on the spacer 80. FIGS. 3(a) to 3(d) show the construction of the spacer 80.

Figure 3A:
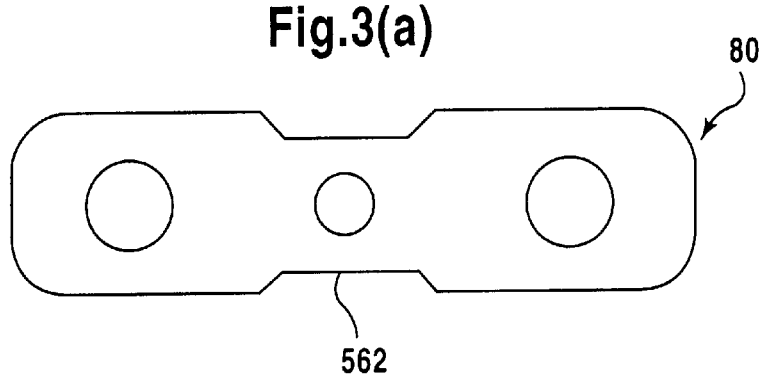
FIGS. 3(a) to 3(d) are views showing a concavity of a spacer of a sealing lid used for a sealed cell of Example 1–2 according to the present invention.
Figure 3B:
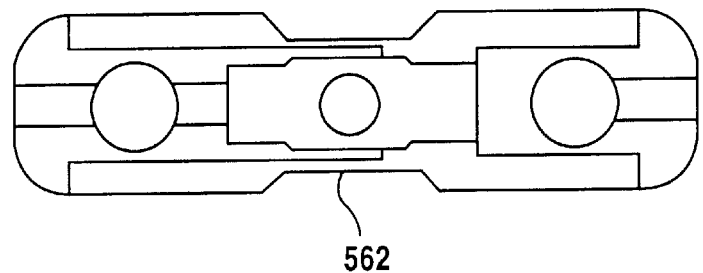
Figure 3C:
Figure 3D:
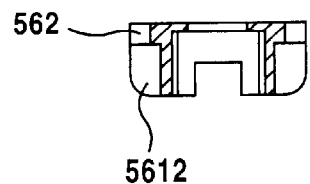
Figure 8A:
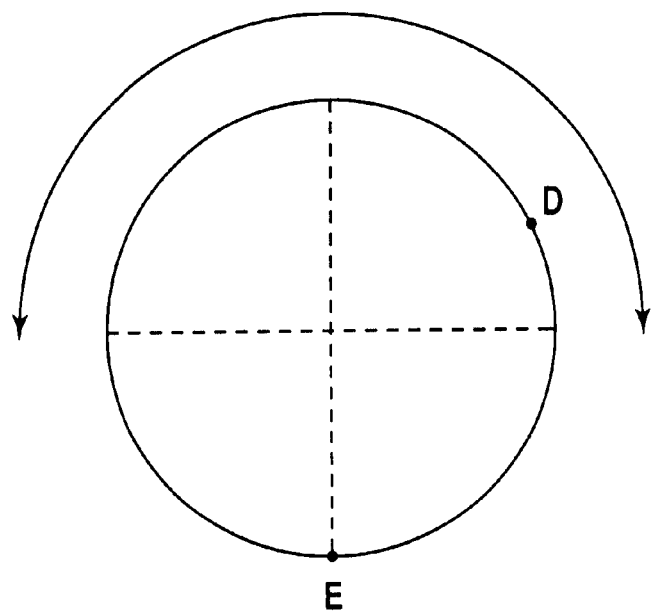
FIGS. 8(a) and 8(b) are plan views showing a location of the shortest distance position and the tip of the first current collector tab in a sealed cell.
Figure 8B:
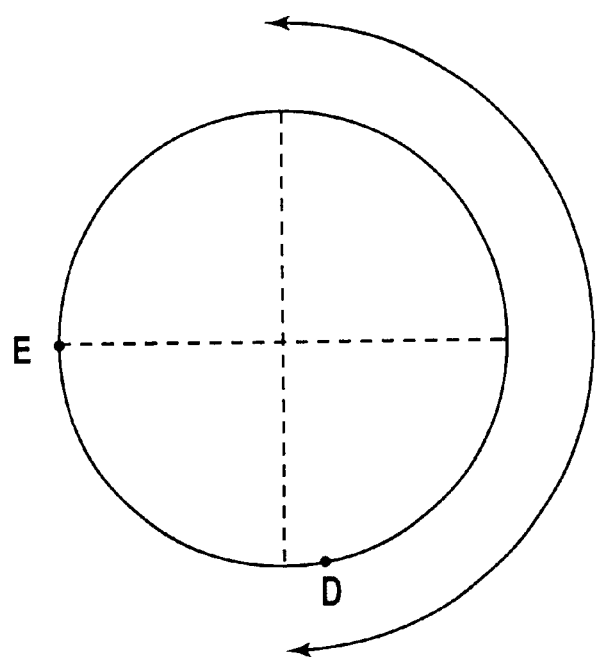
Figure 9A:
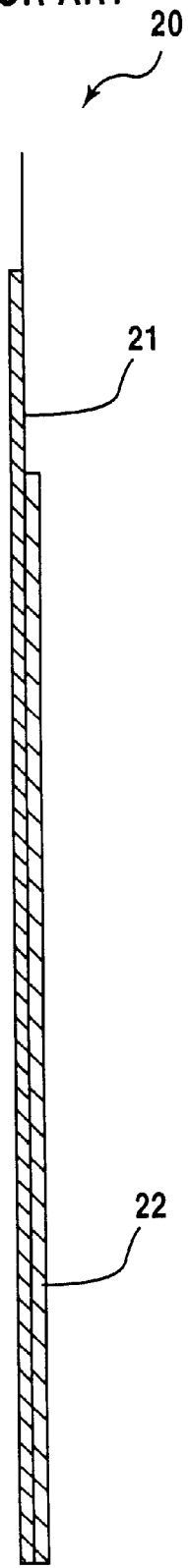
FIGS. 9(a) and 9(b) are constructional views of a positive electrode plate of a prior-art sealed cell.
Figure 9B:
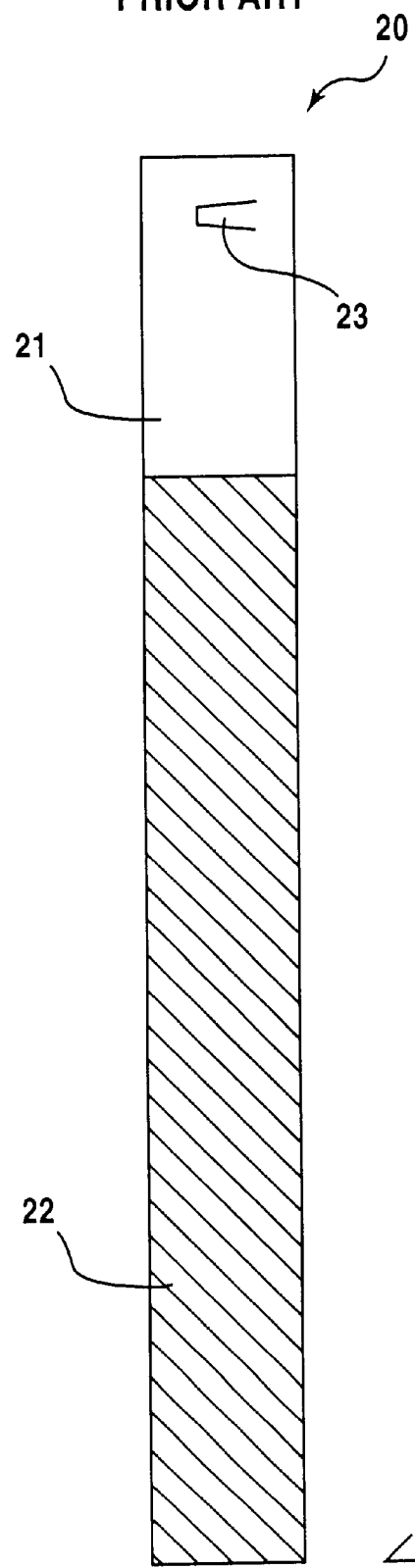
Figure 10A:
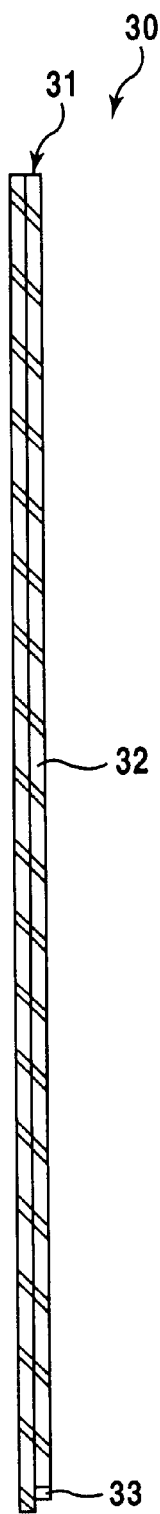
FIGS. 10(a) and 10(b) are constructional views of a negative electrode plate of a prior-art sealed cell.
Figure 10B:
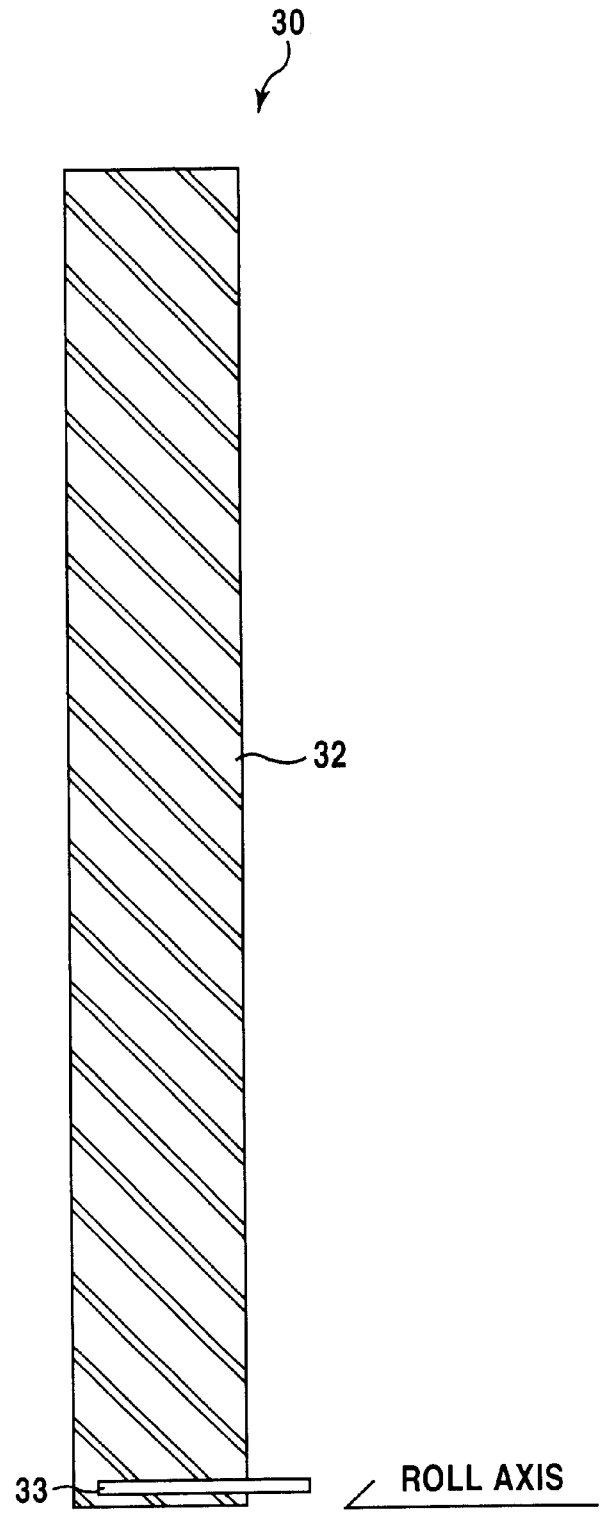
Figure 11:
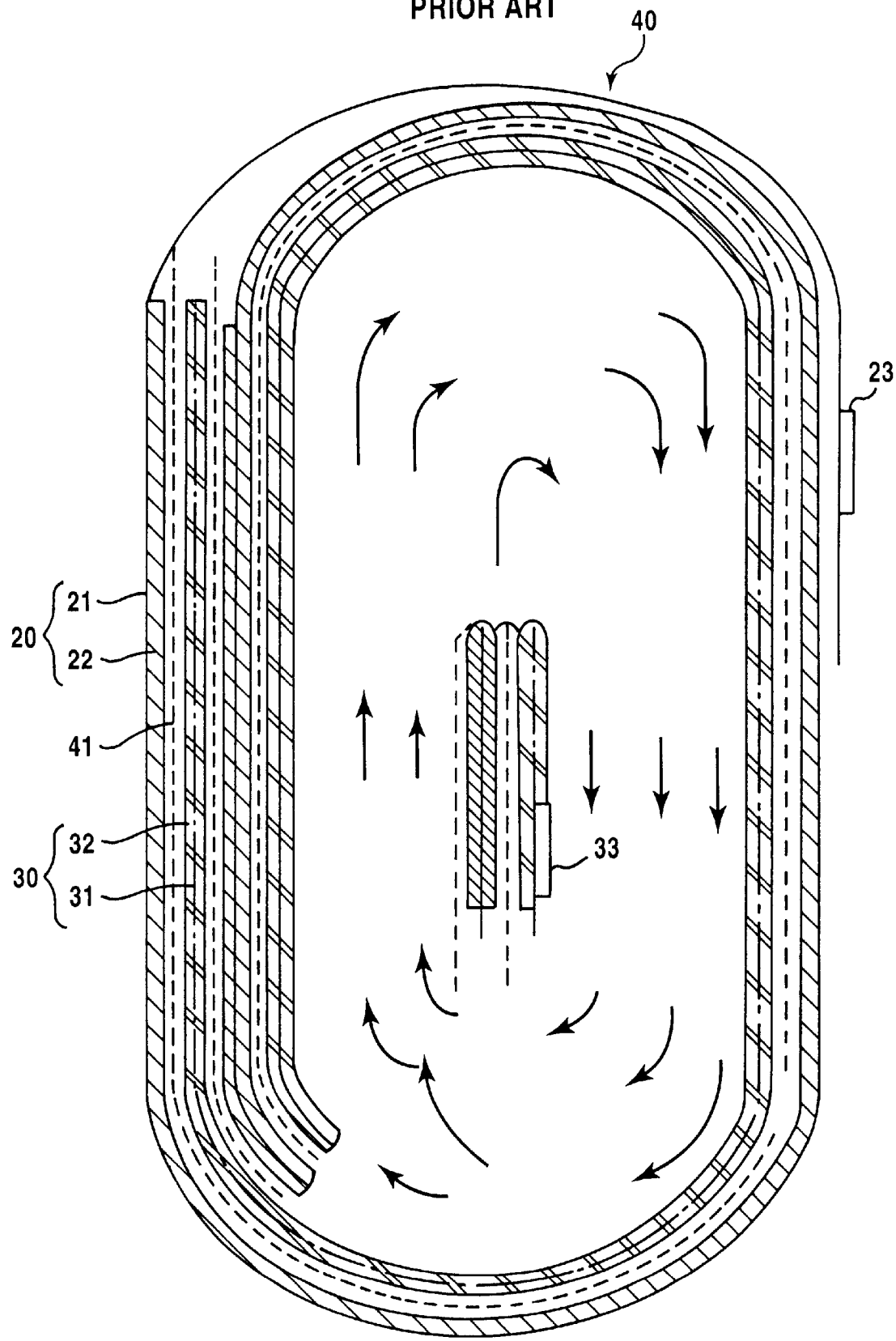
FIG. 11 is a view showing a construction of a transverse (horizontal) cross section of a spirally-wound electrode body of a prior-art sealed cell.

FIG. 3(a) is a top view of the spacer 80, FIG. 3(b) is a bottom view of the spacer 80, FIG. 3(c) is a longitudinal cross sectional view of the spacer 80, and FIG. 3(d) is a lateral cross sectional view of the spacer 80.

Through holes for a safety valve of the cell are provided on the right and left of the spacer 80 shown in FIGS. 3(a) and(b), and the holes have a somewhat complicated shape. Since the holes are not directly related to the point of the present invention and are publicly-known, the description thereof is omitted.

As shown in FIGS. 3(a) and 3(b), the above-mentioned spacer 80 has the concavity (cutoff of surface) 562 in the middle. The positive electrode current collector tab has a bent in the above-mentioned concavity 562 or in a substantial space 5612 below the concavity 562. FIG. 4 shows the state of the positive electrode current collector tab.

FIG. 4 shows that the positive electrode current collector tab 24 has a bent portion 241 in the space 5612 formed by the sealing plate 51, the insulating plate 55 integrally formed with the sealing plate 51, and the spacer 80 below them. When tension acts on the positive electrode current collector tab 24 for some reason (the above-mentioned spirally-wound electrode body moves relatively to the cell outer can by giving a shock such as dropping of the cell), the above-mentioned bent portion 241 extends in the direction of the separator 41 and the tension is decreased, and thereby the disconnection of the positive electrode current collector tab 24 can be prevented. Accordingly, the reliability of the cell can be improved.

Embodiment 2

FIG. 5 is a partially cross sectional view showing a folded portion of a positive electrode current collector tab of a sealed cell according to Embodiment 2 of the present invention. FIG. 6 is a partially cross sectional view showing a laser-welded portion (the opposite side of FIG. 5). FIG. 7 is a cross sectional view taken along the line B—B in FIG. 5.

As shown in FIGS. 5 to 7, the positive electrode current collector tab 24 (the first current collector tab) is formed by folding upward an incised portion formed in a portion of an exposed positive electrode core body on the outermost periphery of the spirally-wound electrode body 40. An insulating sheet 42, composed of an insulating material, is disposed on the above-mentioned spirally-wound electrode body 40. The above-mentioned positive electrode current collector tab 24 is led between the above-mentioned insulating sheet 42 and the spacer 56, from the fold (the position at which the tab is connected with the first electrode plate) of the above-mentioned positive electrode current collector tab 24 to a position (the tip of the current collector tab) of the opposite side of the incised portion, between the circumference of the sealing plate 50 and the internal surface of the cell outer can 60.

When the shape of the open rim of the above-mentioned cell outer can 60 is rectangular and a position in the open rim which is at the shortest distance from a position in the above-mentioned positive electrode current collector tab 24 is defined as a shortest distance position H, the shortest distance position H and a welded part 70 (the tip of the current collector tab), to which the tip of the above-mentioned positive electrode current collector tab 24 is welded, are located on opposing sides of the rectangular open rim, and the above-mentioned shortest distance position H and the above-mentioned welded part 70 are at the shortest possible distance from each other between the opposing sides.

The above-mentioned insulating sheet 42 is provided in order to prevent a short-circuit caused by the contact of the above-mentioned positive electrode current collector tab 24 with a negative electrode plate 30, the second electrode plate in the spirally-wound electrode body 40. It is preferred that the insulating sheet 42 have insulative property and electrolyte-resistance. For instance, polypropylene is usable as the above-mentioned insulating sheet 42.

A sealed cell was manufactured by laser-welding the above-mentioned positive electrode current collector tab 24, the open rim of the top of the cell outer can 60, and the sealing lid 50 together.

In a sealed cell according to Embodiment 2, it is necessary to make the positive electrode current collector tab 24 (formed by folding) longer than a conventional current collector tab, namely, to lengthen the incised portion. It is preferred that the tip of the above-mentioned positive electrode current collector tab 24 project a little over the top of the sealing plate 51.

EXAMPLE 2-1

The above-mentioned sealed cell of Embodiment 2 was used in Example 2-1. The cell thus manufactured is hereinafter referred to as a cell A2 of the present invention.

COMPARATIVE EXAMPLE 2-1

A sealed cell was manufactured as described in the Description of the Prior Art. The cell thus manufactured is hereinafter referred to as a comparative cell X2.

Experiment 2

It was examined that a disconnection of the tab occurs at how many times of drops in the case of the cell A2 of the present invention and the comparative cell X2 by giving shock to them. The result is shown in Table 2. The term "1 set" means a condition of dropping a cell 6 times.

In Experiment 2, the cell A2 of the present invention and the comparative cell X2 are dropped onto P tile (plastic tile) from a height of 30 cm.

TABLE 2

| cell | number of drops at disconnection of tab |
| --- | --- |
| cell A2 of the present invention | 35 to 60 sets (210 to 360 times) |
| comparative cell X2 | 2 to 6 sets (12 to 36 times) |

(1 set = 6 times)

As clearly shown in Table 2, it was confirmed that a disconnection of the positive electrode current collector tab occurred at 2 to 6 sets (12 to 36 times) of drops in the case of the comparative cell X2, while a disconnection of the positive electrode current collector tab did not occur until the cell underwent 35 to 60 sets (210 to 360 times) of drops in the case of the cell A2 of the present invention.

It is understood through the above that the cell A2 of the present invention, wherein the above-mentioned positive electrode current collector tab 24 is led between the above-mentioned insulating sheet 42 and the spacer 56 and the tip of the positive electrode current collector tab 24 is welded to the circumference (the tip of the current collector tab) of the sealing lid 50 on the opposite side of the incised portion (the position at which the tab is connected with the first electrode plate) of the above-mentioned positive electrode current collector tab 24, has a higher reliability in terms of current collection than that of the comparative cell X2.

Other Matters

The present invention is described above according to some Embodiments (or Examples), but the invention is not limited to these Embodiments. That is, the present invention may be carried out according to the following.

Embodiments 1 and 2

(1) The current collector tab formed with an incised portion may be a negative electrode current collector tab.
(2) The current collector tab may be spot-welded on the first electrode plate (a portion of the exposed core body of the positive electrode plate on the outermost periphery of the spirally-wound electrode body), and the current collector tab is not necessarily formed by the incised portion.
(3) Sizes of and materials for the positive and negative electrode core bodies may be other values and substances than those described above. The cell outer can may not necessarily be made of metal.
(4) The cross sectional shape of the cell may be a rectangle with round corners, a circle or an ellipse, or may be a sheet type.
(5) The power-generating component of the cell may be of other types.
(6) Other variations such as an incised portion having a round end may be employed.

Embodiment 1

(7) The shape of the concavity formed on the spacer should be such that the bent portion of the current collector tab in the concavity extends at a drop of the cell, and the relative movement of the spirally-wound electrode body, the cell outer can, and the sealing lid can be suppressed. For instance, the concavity may be U-shaped, V-shaped, or a shape with a double-stepped bottom.
(8) The insulating member may not be of an integrated type but may be of a construction type. At least a part of the insulating member may be made of not rigid body but such elastic body as insulating rubber in order to decrease the influence of manufacturing error and to secure an appropriate pressure. For example, the insulating member may be manufactured such that a thin rubber sheet is cut in the shape shown in FIG. 3(a) and a portion corresponding to the concavity is cut off, as shown in the middle of FIG. 3(a).
(9) The current collector tab may have a double-stepped or triple-stepped bent portion in the concavity.

Embodiment 2

(10) The contact of the positive electrode current collector tab with the negative electrode plate in a spirally-wound electrode body is prevented by coating an insulating material on the positive electrode current collector tab, instead of the use of the insulating sheet.
(11) The contact of the positive electrode current collector tab with the negative electrode plate is prevented by winding the spirally-wound electrode body with the separator so that the positive electrode plate projects from the edge of the negative electrode plate in the direction of the opening of the cell outer can.

What is claimed is:

1. A sealed cell comprising:

a cell outer can having a hollow body with a bottom and an opening;

a spirally-wound electrode body accommodated in said cell outer can, including a first electrode plate and a second electrode plate wound with a separator;

a sealing lid having a sealing plate sealed to said opening of the cell outer can; and a first current collector tab derived from a portion of an exposed core body of the first electrode plate on an outermost periphery of said spirally-wound electrode body;

wherein:

the first current collector tab, the cell outer can and the sealing plate are welded with a tip of said first current collector tab being held between said sealing plate and an open rim of said cell outer can; and said tip of the first current collector tab is welded at a position in said open rim, wherein the first current collector tab includes a bent portion, whereby a disconnection of the first current collector tab caused by a movement of the spirally-wound electrode body is prevented.

2. The sealed cell according to claim 1, wherein:

the shape of the open rim of said cell outer can is substantially rectangular; and said tip of the first current collector tab is located on a side of the rectangular shape opposing the side where said first current collector tab connecting with said first electrode plate is located.

3. The sealed cell according to claim 2, wherein:

in the open rim oft he cell outer can, said tip oft he first current collector tab is located at such a position that is at the shortest possible distance from where said current collector tab connects with said first electrode plate.

4. The sealed cell according to claim 1, wherein:

the shape of the open rim of said cell outer can is a circle or an ellipse; and said tip of the first current collector tab is located at a position on a semicircle or a semiellipse on said open rim, said semicircle or said semiellipse opposing a position where said first current collector tab connects with said first electrode plate.

5. The sealed cell according to claim 2, wherein:

said first current collector tab is led between an insulating member and said spirally-wound electrode body, said insulating member disposed on a bottom of said sealing plate; and said sealed cell further comprises means for preventing a short circuit between said first current collector tab and said second electrode plate, said means disposed between said first current collector tab and said spirally-wound electrode body.

6. The sealed cell according to claim 5, wherein:

said means for preventing a short-circuit is an insulating body disposed on said spirally-wound electrode body.

7. The sealed cell according to claim 1, wherein:

said first current collector tab is formed by giving a slit to a portion of an exposed core body of the first electrode plate on an outermost periphery of said spirally-wound electrode body, and folding the slit in a direction of an opening of said cell outer can.

8. A sealed cell comprising:

a cell outer can having a hollow body with a bottom and an opening;

a spirally-wound electrode body accommodated in said cell outer can, including a first electrode plate and a second electrode plate wound with a separator;

a sealing lid having a sealing plate sealed to said opening of the cell outer can and an insulating member on a bottom of said sealing plate; and a first current collector tab derived from a portion of an exposed core body of the first electrode plate on an outermost periphery of said spirally-wound electrode body;

wherein:

the first current collector tab, the cell outer can and the sealing plate are welded with a tip of said first current collector tab being held between said sealing plate and an open rim of said cell outer can;

said insulating member has a concavity in a portion in which said first current collector tab is led in a direction of the opening of said cell outer can; and said first current collector tab has a bent portion in the concavity of said insulating member.

9. The sealed cell according to claim 8, wherein:

said concavity is opened in a direction of the bottom of said cell outer can.

10. The sealed cell according to claim 8, wherein:

said first current collector tab is formed by giving a slit to a portion of an exposed core body of the first electrode plate on an outermost periphery of said spirally-wound electrode body, and folding the slit in a direction of an opening of said cell outer can.

11. A sealed cell comprising:

a cell outer can having a hollow body with a bottom and an opening;

a spirally-wound electrode body accommodated in said cell outer can, including a first electrode plate and a second electrode plate wound with a separator;

a sealing lid having a sealing plate sealed to said opening of the cell outer can; and a first current collector tab derived from a portion of an exposed core body of the first electrode plate on an outermost periphery of said spirally-wound electrode body;

wherein:

the first current collector tab, the cell outer can and the sealing plate are welded with a tip of said first current collector tab being held between said sealing plate and an open rim of said cell outer can;

wherein the first current collector tab includes a bent portion, whereby a disconnection of the first current collector tab caused by a movement of the spirally-wound electrode body is prevented.

* * * * *